United States Patent
Lee et al.

(10) Patent No.: US 11,454,309 B2
(45) Date of Patent: Sep. 27, 2022

(54) COMPOSITION FOR WORM WHEEL HAVING EXCELLENT DURABILITY WITH WEAR RESISTANCE AND WORM WHEEL PREPARED USING THE SAME

(71) Applicants: HYUNDAI MOBIS CO., LTD., Seoul (KR); LG CHEM, LTD., Seoul (KR)

(72) Inventors: Jin Won Lee, Yongin-si (KR); Yeong Ah Cheon, Yongin-si (KR); Woo Jeong Oh, Yongin-si (KR); Jae Kyung Yang, Daejeon (KR); Jae Wha Kim, Daejeon (KR); Soo Min Kim, Daejeon (KR); Min Han Kwak, Daejeon (KR); Sang Rock Lee, Daejeon (KR)

(73) Assignees: HYUNDAI MOBIS CO., LTD., Seoul (KR); LG CHEM, LTD., Seoul (KR)

( * ) Notice: Subject to any disclaimer, the term of this patent is extended or adjusted under 35 U.S.C. 154(b) by 125 days.

(21) Appl. No.: 16/840,099

(22) Filed: Apr. 3, 2020

(65) Prior Publication Data
US 2020/0318723 A1   Oct. 8, 2020

(30) Foreign Application Priority Data

Apr. 4, 2019   (KR) .......................... 10-2019-0039409

(51) Int. Cl.
*F16H 55/22* (2006.01)
*F16H 55/17* (2006.01)
*F16H 55/06* (2006.01)

(52) U.S. Cl.
CPC ............. *F16H 55/22* (2013.01); *F16H 55/17* (2013.01); *F16H 2055/065* (2013.01)

(58) Field of Classification Search
CPC ..... F16H 55/22; F16H 55/17; F16H 2055/065
See application file for complete search history.

(56) References Cited

U.S. PATENT DOCUMENTS

| | | | |
|---|---|---|---|
| 2007/0021558 A1* | 1/2007 | Shinohara ............... | C08L 77/00 525/66 |
| 2017/0066922 A1 | 3/2017 | Yoshimura | |
| 2017/0166239 A1* | 6/2017 | Kim ...................... | B62D 5/008 |
| 2018/0044519 A1 | 2/2018 | Youn et al. | |
| 2018/0179381 A1* | 6/2018 | Miyamoto ............. | C08L 23/12 |

(Continued)

FOREIGN PATENT DOCUMENTS

| | | |
|---|---|---|
| CN | 103756300 B | 9/2015 |
| CN | 105949765 A | 9/2016 |

(Continued)

OTHER PUBLICATIONS

Japanese Office Action issued in JP 2020-039853 dated Mar. 9, 2021.
English Language Abstract of JP 2001-098148 published Apr. 10, 2001.
English Language Abstract of JP 2003-083423 published Mar. 19, 2003.

(Continued)

*Primary Examiner* — Terence Boes
(74) *Attorney, Agent, or Firm* — DLA Piper LLP (US)

(57) ABSTRACT

The present disclosure relates to a composition for a worm wheel having excellent durability and wear resistance and a worm wheel manufactured using the same. In one embodiment, the composition for a worm wheel includes a polyamide resin, wherein the polyamide resin includes a polyamide 66 resin having a relative viscosity (RV) of about 2.5 or higher and a polyamide 12 resin having a relative viscosity (RV) of about 1.0 or higher.

13 Claims, 3 Drawing Sheets

(56) References Cited

U.S. PATENT DOCUMENTS

2020/0308392 A1* 10/2020 Lee ..................... C08G 69/08
2021/0231196 A1* 7/2021 Tsuzuki ................. F16H 55/06
2021/0293319 A1* 9/2021 Cheon .................... F16H 55/22

FOREIGN PATENT DOCUMENTS

| JP | S58-74748 | 5/1983 | | |
|----|-----------|--------|---|---|
| JP | H 09-057790 A | 3/1997 | | |
| JP | H10-310704 | 11/1998 | | |
| JP | 2001-098148 | 4/2001 | | |
| JP | 2003-083423 | 3/2003 | | |
| JP | 2005-273884 | 10/2005 | | |
| JP | 2016-130273 | 7/2016 | | |
| JP | 2019038994 A | * | 3/2019 | ............ C08L 77/00 |
| KR | 10-2018-0135541 A | 12/2018 | | |
| WO | WO 2018-008473 | 1/2018 | | |

OTHER PUBLICATIONS

English Language Abstract of JP 2016-130273 published Jul. 21, 2016.
English Language Abstract of JP 2005-273884 published Oct. 6, 2005.
English Language Abstract of JP H10-310704 published Nov. 24, 1998.
English Language Abstract of JP S58-74748 published May 6, 1983.
English Language Abstract of WO 2018-008473 published Jan. 11, 2018.
Lee et al., "Development of material for MDPS worm wheel with lower water absorption and high durability using a composite of polyamide and modified polyolefin"—5 pages (Jun. 7, 2018).
Extended European Search Report dated Aug. 28, 2020 in European Patent No. 20166561.9 (56 pages).

* cited by examiner (a)    (b)

(a) Example 7

(b) Comparative Example 3

COMPOSITION FOR WORM WHEEL HAVING EXCELLENT DURABILITY WITH WEAR RESISTANCE AND WORM WHEEL PREPARED USING THE SAME

CROSS-REFERENCE TO RELATED APPLICATION

The present application claims priority under 35 U.S.C. § 119(a) to Korean Patent Application No. 10-2019-0039409 filed on Apr. 4, 2019 in the Korean Intellectual Property Office, which is incorporated herein by reference in its entirety.

BACKGROUND

1. Technical Field

Embodiments of the present disclosure relate to a composition for a worm wheel having excellent durability and wear resistance and a worm wheel manufactured using the same.

2. Related Art

A motor-driven power steering (MDPS) is the latest steering performance system using an electric motor, and has been widely applied to small cars and midsize cars. The MDPS drives an electric motor connected directly to a steering system without using hydraulic power, unlike a hydraulic power steering, and has improved fuel efficiency and life span and excellent lightweight characteristics compared to a conventional hydraulic power steering.

The MDPS accurately drives the motor in an electronic control system depending on the vehicle running conditions sensed by various sensors such as a vehicle speed sensor and a steering torque sensor. A torque generated by the motor is transmitted to a steering column or pinion through a reducer, thereby assisting the steering force of a driver operating a steering wheel connected to the steering column and pinion. Accordingly, the motor-driven power steering system provides a light and comfortable steering state during low-speed driving, while providing a heavy and stable steering state during high-speed driving. Furthermore, the motor-driven power steering system may cope with sudden emergency conditions to enable a rapid steering operation, thus providing steering performance to help the driver maintain optimal steering conditions.

The MDPS (motor-driven power steering) system includes a worm, a worm wheel, and a motor for driving a reducer. Among them, the worm wheel, a key part of the MDPS, is made of a plastic material having excellent durability instead of a metal, due to NVH (noise, vibration, and harshness) issues.

As a worm wheel material used in a conventional prior art, high-molecular-weight polyamide 66 (PA 66) is mainly used. However, when the high-molecular-weight polyamide 66 was applied to the worm wheel, the durability of the worm wheel was limited. Therefore, there is a demand for developing a worm wheel material having excellent durability.

In the development of conventional worm wheel materials, components such as lubricants, silicone and PTFE were generally added in order to improve the wear resistance of the materials, and matrix resins having a high molecular weight or a high relative viscosity were used. In addition, in an attempt to improve the wear resistance properties of the material by increasing the hardness, reinforcing materials such as glass fiber and carbon fiber were also added.

When high-molecular-weight polymers are used in the development of the worm wheel materials as described above, the wear resistance of the worm wheel material becomes better due to improvement in the adhesive wear properties thereof. However, the higher the molecular weight of the material, the lower the fluidity, which may lead to lower injection moldability and lower productivity. In addition, the worm wheel material shows better wear resistance than a low-molecular-weight polymer due to its improved adhesive wear properties, but the fatigue wear properties thereof are deteriorated by an internal stress which occurs during product molding due to its low fluidity. Due to this deterioration in the fatigue wear properties, in the worm wheel part in which a load acts repeatedly on the friction surface, a crack easily occurs due to internal stress over time, and wear and breakage of the part may abruptly occur while the stress is concentrated at the crack.

Meanwhile, the addition of a lubricant such as silicone oil reduces the coefficient of friction, thereby reducing the adhesive wear of two products that are in contact with each other. However, since the lubricant component has a low molecular weight, the lubricant component itself applied to the worm wheel surfaces may undergo adhesive wear after a long period of time, and wear of the worm wheel surfaces may be promoted due to dry sliding (a wear phenomenon in which the worm wheel product surfaces are worn out by detached fine particles or other foreign matters, dust, etc., sandwiched between the surfaces) caused by the detached fine particles of the lubricating component, and thus the wear resistance of the worm wheel surfaces may deteriorate.

In addition, when a chemical material such as grease comes into contact with the worm wheel surface, corrosive wear of the worm wheel surface may proceed, causing wear debris which may also promote wear by dry sliding, thus reducing the wear resistance of the worm wheel surface. In addition, a phenomenon may occur in which the worm wheel product is broken due to the occurrence of surface cracks.

Therefore, the conventional art can realize excellent wear resistance under a condition in which a load is repeatedly applied to the product surface for a short period of time, but has a limitation in that the wear resistance of the worm wheel is abruptly lowered under a condition in which a load is repeatedly applied to the surface for a long period of time. In recent years, in a severe use environment in which a higher load than previous one is repeatedly applied for a long time, a phenomenon has occurred in which a conventional worm wheel material is broken without withstanding the severe environment. Accordingly, it is necessary to develop a material which has excellent wear resistance and is easily injection-molded.

Background art related to the present disclosure is disclosed in Korean Patent Application Laid-Open No. 2018-0135541 (published on Dec. 21, 2018; entitled "Method for Manufacturing Worm Wheel").

SUMMARY

One object of the present disclosure is to provide a composition for a worm wheel having excellent durability, wear resistance and dimensional stability.

Another object of the present disclosure is to provide a composition for a worm wheel having excellent chemical resistance and moisture absorption resistance.

Still another object of the present disclosure is to provide a composition for a worm wheel which exhibits excellent wear resistance properties even under a condition in which a load is applied over a long period of time.

Yet another object of the present disclosure is to provide a composition for a worm wheel having excellent injection moldability, productivity and economic efficiency.

Still yet another object of the present disclosure is to provide a worm wheel manufactured using the composition for a worm wheel.

One aspect of the present disclosure is directed to a composition for a worm wheel. In one embodiment, the composition for a worm wheel includes a polyamide resin, wherein the polyamide resin includes a polyamide 66 resin having a relative viscosity (RV) of about 2.5 or higher and a polyamide 12 resin having a relative viscosity (RV) of about 1.0 or higher.

In one embodiment, the composition for a worm wheel may further include a modified nano-clay.

In one embodiment, the composition for a worm wheel may include about 90 wt % to about 99.9 wt % of the polyamide resin and about 0.1 wt % to about 10 wt % of the modified nano-clay.

In one embodiment, the polyamide resin may further include a polyamide 6 resin having a relative viscosity (RV) of about 2.5 or higher.

In one embodiment, the polyamide resin may include, based on the total weight of the composition, about 50 wt % to about 85 wt % of the polyamide 66 resin, about 5 wt % to about 20 wt % of the polyamide 6 resin, and about 5 wt % to about 40 wt % of the polyamide 12 resin.

In one embodiment, the polyamide 66 resin may have a relative viscosity (RV) of about 2.5 to about 5.5, the polyamide 6 resin may have a relative viscosity (RV) of about 2.5 to about 3.5, and the polyamide 12 resin may have a relative viscosity (RV) of about 1.4 to about 2.8.

In one embodiment, the modified nano-clay may be a nano-clay treated with a modifier including one or more of a trialkyl ammonium salt and an alkyl quaternary ammonium salt, wherein the nano-clay may include one or more of bentonite, hectorite, fluorohectorite, montmorillonite, saponite, beidellite, vermiculite and magadiite.

In one embodiment, the modified nano-clay may have a bulk density of about 0.11 g/cm$^3$ to about 0.25 g/cm$^3$ and a d-spacing of about 10 Å to about 35 Å.

In one embodiment, the modifier may be included at a concentration of about 85 meq/(100 g nano-clay) to about 125 meq/(100 g nano-clay).

In one embodiment, the modifier may include bis(hydrogenated tallow alkyl) dimethyl salt.

In one embodiment, the composition for a worm wheel may have a structure in which the modified nano-clay is attached at the hydrogen bonding position of the polyamide resin.

In one embodiment, the composition for a worm wheel may have a weight difference of about 200 mg or less between before and after a Taber Abrasion Test (abrasive wheels: H-10; load applied to one wheel: 1 kg; 70 rpm; and 3,000 cycles) conducted in accordance with ISO 9352.

Another aspect of the present disclosure is directed to a worm wheel manufactured using the composition for a worm wheel.

The composition for a worm wheel according to the present disclosure may have excellent durability, wear resistance, dimensional stability, chemical resistance and moisture absorption resistance. In particular, the composition for a worm wheel may exhibit excellent wear resistance properties even under a condition in which a load is applied repeatedly to the product surface for a long period of time. In addition, the composition for a worm wheel may have excellent fluidity, injection moldability, productivity and economic efficiency.

DETAILED DESCRIPTION

Figure 1:
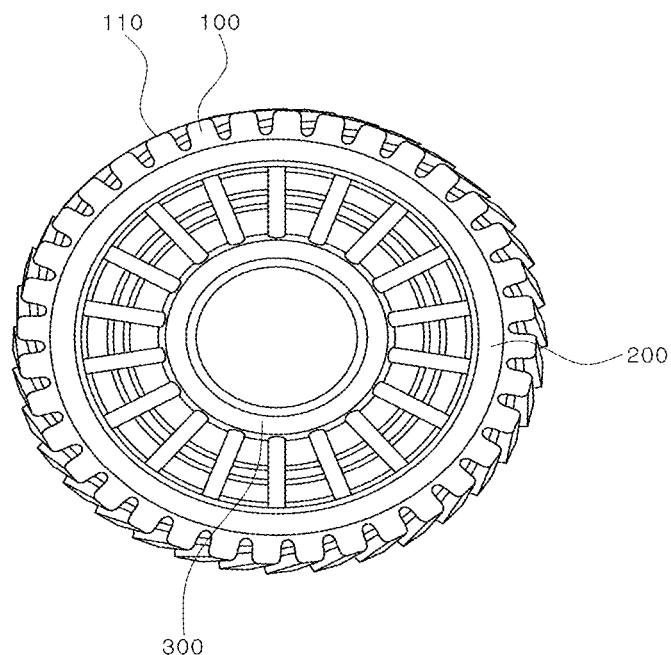
FIG. 1 illustrates a worm wheel according to one embodiment of the present disclosure.

In the following description, the detailed description of related publicly-known technology or configuration will be omitted when it may unnecessarily obscure the subject matter of the present disclosure.

In addition, the terms used in the following description are terms defined taking into consideration the functions obtained in accordance with embodiments of the present disclosure, and may be changed in accordance with the option of a user or operator or a usual practice. Accordingly, the definition of the terms should be made based on the contents throughout the present specification.

Composition for Worm Wheel

One aspect of the present disclosure is directed to a composition for a worm wheel. In one embodiment, the composition for a worm wheel includes a polyamide resin, wherein the polyamide resin includes a polyamide 66 resin having a relative viscosity (RV) of about 2.5 or higher and a polyamide 12 resin having a relative viscosity (RV) of about 1.0 or higher.

Polyamide Resin

The polyamide resin may include an aliphatic polyamide resin. For example, the polyamide resin includes a polyamide 66 resin and a polyamide 12 resin. When the composition includes the polyamide resin satisfying this condition, the miscibility, wear resistance and elongation of the composition may be excellent.

In one embodiment, the relative viscosity (RV) of the polyamide 66 resin is about 2.5 or higher. Under this relative viscosity condition, the wear resistance properties of the composition may be improved while the fluidity and miscibility of the composition are excellent. If the relative viscosity of the polyamide resin is lower than about 2.5, the fluidity and miscibility of the composition may be lowered or the wear resistance properties of the composition may deteriorate. For example, the relative viscosity of the polyamide 66 resin may be about 2.5 to about 5.5. For another example, the relative viscosity of the polyamide 66 resin may be about 2.6 to about 2.9. For example, it may be about 2.6, 2.7, 2.8 or 2.9.

In one embodiment, the relative viscosity (RV) of the polyamide 12 resin is about 1.0 or higher. Under this relative viscosity condition, the fluidity and miscibility of the composition may be excellent. If the relative viscosity of the polyamide 12 resin is lower than about 1.0, the fluidity and miscibility of the composition may be lowered or the wear resistance properties of the composition may deteriorate. For example, the relative viscosity of the polyamide 12 resin may be about 1.4 to about 3.3. For another example, the relative viscosity of the polyamide 12 resin may be about 1.4 to about 2.8. For example, it may be about 1.4 to about 2.5. For example, it may be about 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2 or 3.3.

In one embodiment, the relative viscosity is a value measured at 25° C. after adding 1 wt % of the polyamide resin to 96% sulfuric acid.

In one embodiment, the polyamide resin may include, based on the total weight of the composition for a worm wheel, about 50 wt % to about 85 wt % of the polyamide 66 resin and about 15 wt % to about 50 wt % of the polyamide 12 resin. When the polyamide 66 resin and the polyamide 12 resin are included in amounts within the above ranges, the composition may have excellent miscibility, dimensional stability, durability and wear resistance.

In one embodiment, the polyamide resin may further include a polyamide 6 resin. When the polyamide 6 resin is included, the wear resistance and elongation of the composition may be excellent.

In one embodiment, the relative viscosity (RV) of the polyamide 6 resin may be about 2.5 or higher. Under this relative viscosity condition, the wear resistance properties of the composition may be improved while the fluidity and miscibility of the composition are excellent. For example, the relative viscosity of the polyamide 6 resin may be about 2.6 to about 3.5. For another example, it may be about 2.9 to about 3.3. For still another example, it may be about 3.0 to about 3.3.

In other embodiments, the polyamide resin may include, based on the total weight of the composition for a worm wheel, about 50 wt % to about 85 wt % of the polyamide 66 resin, about 5 wt % to about 20 wt % of the polyamide 6 resin, and about 5 wt % to about 40 wt % of the polyamide 12 resin. Under these content conditions, an unpredictable synergistic effect between the constituent components of the polyamide resin may be created, and thus the miscibility and fluidity of the composition may be excellent, and the effect of improving the wear resistance and elongation of the composition may be excellent. For example, the polyamide resin may include, based on the total weight of the composition for a worm wheel, about 50 wt % to about 60 wt % of the polyamide 66 resin, about 10 wt % to about 20 wt % of the polyamide 6 resin, and about 25 wt % to about 35 wt % of the polyamide 12 resin.

If only the polyamide 66 resin is applied in the present disclosure, the seasonal dimensional changes of the composition may be significant due to its high moisture absorption rate, and hence the wear resistance properties of the composition may deteriorate due to shrinkage and expansion. On the other contrary, when the polyamide 66, polyamide 6 and polyamide 12 resins are applied together in the present disclosure, the composition may have low moisture absorption rate, low shrinkage rate, and high dimensional stability, and the seasonal dimensional changes thereof may be insignificant, so that the wear resistance of the composition may be prevented from deteriorating.

In addition, it is possible to prevent the wear resistance of the composition from deteriorating due to, for example, surface crazing which is caused by a chemical reaction resulting from the application of a lubricant (such as grease) to the surface of the worm wheel of the present disclosure and by heat resulting from repeated friction between parts.

The polyamide 12 resin has high chemical resistance to a lubricant such as grease. Thus, when the polyamide 12 resin is included in the composition of the present disclosure, it may have an excellent effect of preventing crazing and dry sliding from being caused by a lubricant (grease) applied to the surface of the worm wheel of the present disclosure.

In addition, when the polyamide resin of the present disclosure is applied, the ductility thereof may be excellent, and thus deformation may occur within a range that does not break the worm wheel, even under a condition in which an excessive load is applied. Thus, the polyamide resin may have an excellent effect of preventing cracking of the worm wheel from being caused by fatigue wear.

Although the polyamide 12 resin has a high molecular weight, it has high excellent injection moldability due to its low melting point and high fluidity, and also shows excellent dimensional stability due to its low moisture absorption properties. Due to these effects, the polyamide 12 resin may have an excellent effect of suppressing fatigue wear by minimizing internal stress.

In addition, the polyamide 6 resin has a high shear strength than the polyamide 12 resin, has a better fluidity due to a lower melting point than the polyamide 66 resin, and may maximize the synergistic effect between the polyamide 12 resin and the polyamide 66 resin by imparting the intermediate properties therebetween.

In one embodiment, the polyamide resin may be included in an amount of about 90 wt % to about 99.9 wt % based on the total weight of the composition. When the polyamide resin is included in an amount within the above range, the durability, wear resistance and impact resistance of the composition may be excellent. For example, the polyamide resin may be included in an amount of about 95 wt % to about 99.5 wt %. For another example, it may be included in an amount of about 97 wt % to about 99.4 wt %. For example, it may be included in an amount of about 90, 91, 92, 93, 94, 95, 96, 97, 98, 99, 99.1, 99.2, 99.3, 99.4, 99.5, 99.6, 99.7, 99.8 or 99.9 wt %.

Modified Nano-Clay

The modified nano-clay is a material obtained by treating nano-clay with a modifier. When the composition includes the modified nano-clay, it may have excellent chemical resistance and wear resistance properties. The nano-clay has a structure in which lamellar crystalline layers, each having a width and length of about 1 nm to about 100 nm and a thickness of about 0.1 nm to about 3 nm, are stacked.

In one embodiment, the nano-clay may include one or more of bentonite, hectorite, fluorohectorite, montmorillonite, saponite, beidellite, vermiculite and magadiite.

In one embodiment, the modified nano-clay may have a bulk density of about 0.11 $g/cm^3$ to about 0.25 $g/cm^3$ and a d-spacing of about 10 Å to about 35 Å. Under these conditions, the wear resistance of the composition may be excellent. For example, the modified nano-clay may have a bulk density of about 7 $lb/ft^3$ to about 14 $lb/ft^3$ and a d-spacing of about 15 Å to about 25 Å. For another example, the modified nano-clay may have a bulk density of about 7 $lb/ft^3$ to about 14 $lb/ft^3$.

In one embodiment, the modifier may be included at a concentration of about 85 meq/(100 g nano-clay) to about 125 meq/(100 g nano-clay). Under this condition, the wear resistance of the composition may be excellent. For example, the modifier may be included at a concentration of about 90 meq/(100 g nanoclay) to about 100 meq/(100 g nanoclay).

In one embodiment, the modifier may include one or more of a trialkyl ammonium salt and an alkyl quaternary ammonium salt.

In one embodiment, the alkyl quaternary ammonium salt may include one or more of dimethyl benzyl hydrogenated tallow quaternary ammonium, dimethyl hydrogenated tallow quaternary ammonium, methyl tallow bis-2-hydroxyethyl quaternary ammonium, dimethyl hydrogenated tallow 2-ethylhexyl quaternary ammonium and bis(hydrogenated tallow alkyl)dimethyl salts.

In one embodiment, the alkyl quaternary ammonium salt may include a bis(hydrogenated tallow alkyl)dimethyl salt including a structure of the following Formula 1:

[Formula 1]
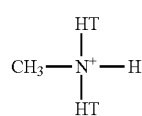

wherein T is a tallow including 65 wt % or less of $C_{18}$, 30 wt % or less of $C_{16}$ and 5 wt % or less of $C_{14}$.

FIG. 3(a) shows the hydrogen bonding structure of the polyamide resin, and FIG. 3(b) shows a structure in which the modified nano-clay is attached at the hydrogen bonding position of the polyamide resin according to the present disclosure.

Figure 3:
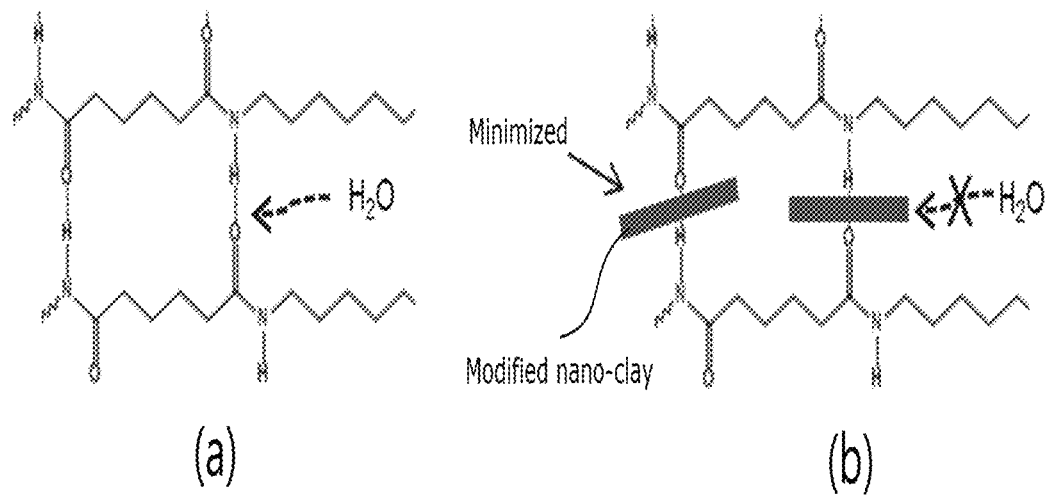
FIG. 3 shows (a) the hydrogen bonding structure of a polyamide resin, and (b) a structure in which a modified nano-clay is attached at the hydrogen bonding position of a polyamide resin according to the present disclosure.

Referring to FIG. 3, the composition for a worm wheel according to the present disclosure may have a structure in which the modified nano-clay is attached at the hydrogen bonding position of the polyamide resin. The attached modified nano-clay may suppress polymer chain decomposition caused by penetration of the lubricant, thereby blocking the discoloration mechanism of the product and suppressing adhesive wear and corrosive debris from being caused by the decomposed lubricant component. In addition, the modified nano-clay, intercalated and exfoliated in the polyamide resin of the present disclosure, may reduce the scratch depth, exhibit an excellent effect of suppressing wear and dry sliding by increasing hardness, and improve the wear resistance of the composition.

In one embodiment, the modified nano-clay may be included in an amount of about 0.1 wt % to about 10 wt % based on the total weight of the composition. When the modified nano-clay is included in an amount within the above range, it may have an excellent effect of improving wear resistance, and the elongation, durability and impact resistance of the composition may be excellent. For example, the modified nano-clay may be included in an amount of about 0.5 wt % to about 5 wt %. For another example, it may be included in an amount of about 0.6 wt % to about 3 wt %. For example, it may be included in an amount of about 0.1, 0.2, 0.3, 0.4, 0.5, 0.6, 0.7, 0.8, 0.9, 1, 2, 3, 4, 5, 6, 7, 8, 9 or 10 wt %.

In one embodiment, the composition for a worm wheel may be finally prepared by extruding a mixture including the polyamide 66 resin, the polyamide 6 resin, the polyamide 12 resin and the modified nano-clay through an extruder. For example, the composition for a worm wheel may be prepared by introducing a mixture including the polyamide resin and the modified nano-clay into a twin-screw extruder, and melt-kneading and extruding the mixture. In one embodiment, the extrusion may be performed at an extrusion temperature of about 200° C. to about 280° C. and a screw rotation speed of about 100 rpm to about 350 rpm. Under these conditions, the composition for a worm wheel may be easily prepared.

In one embodiment, the composition for a worm wheel may have a weight difference of about 200 mg or less between before and after a Taber Abrasion Test (abrasive wheels: H-10; load applied to one wheel: 1 kg; 70 rpm; and 3,000 cycles) conducted in accordance with ISO 9352. For example, the weight difference may be 120 mg or less. For another example, the weight difference may be about 60 mg or less.

In other embodiments, the composition for a worm wheel may have a weight difference of about 150 mg or less between before and after a Taber Abrasion Test (abrasive wheels: H-18; load applied to one wheel: 1 kg; 70 rpm; and 3,000 cycles) conducted in accordance with ISO 9352. For example, the weight difference may be about 100 mg or less. For another example, the weight difference may be about 50 mg or less.

Worm Wheel Manufactured Using Composition for Worm Wheel

Another aspect of the present disclosure is directed to a worm wheel manufactured using the composition for a worm wheel. FIG. 1 illustrates a worm wheel according to one embodiment of the present disclosure, and FIG. 2 is a perspective view of the worm wheel according to one embodiment of the present disclosure.

Figure 2:
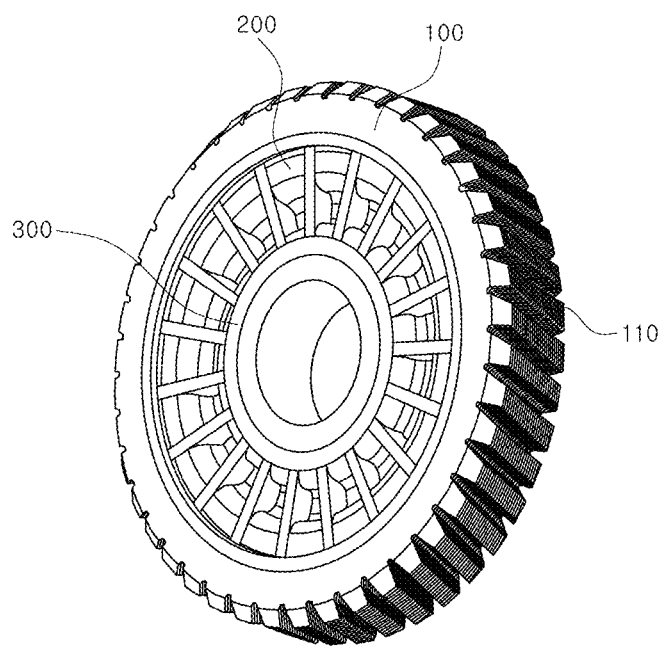
FIG. 2 is a perspective view of the worm wheel according to one embodiment of the present disclosure.

Referring to FIGS. 1 and 2, a worm wheel 1000 according to the present disclosure may include: a cylindrical boss portion 300 having a cavity formed in the center thereof; a gear portion 100 having a plurality of gear teeth 110 formed along the outer circumference thereof; and a hub portion 200 formed between the outer circumference of the boss portion 300 and the inner circumference of the gear portion 100, wherein one or more of the boss portion 300, the gear portion 100 and the hub portion 200 may be manufactured using the composition for a worm wheel.

The composition for a worm wheel according to the present disclosure and a worm wheel manufactured using the same may have excellent durability, wear resistance, dimensional stability, chemical resistance and moisture absorption resistance. In particular, the composition for a worm wheel and the worm wheel may exhibit excellent wear resistance properties even under a condition in which a load is applied repeatedly to the product surface for a long period of time. In addition, the composition for a worm wheel and the worm wheel may have excellent fluidity, injection moldability, productivity and economic efficiency.

Hereinafter, the configuration and effects of the present disclosure will be described in more detail with reference to preferred examples. However, these examples are presented as preferred examples of the present disclosure and may not be construed as limiting the scope of the present disclosure in any way. The contents that are not described herein can be sufficiently and technically envisioned by those skilled in the art, and thus the description thereof will be omitted herein.

Examples and Comparative Examples

The components used in the Examples of the present disclosure and Comparative Examples are as follows.

(A) Polyamide 66 resin: (A1) a polyamide 66 resin having a relative viscosity of at least 2.2 and lower than 2.5 was used. (A2) a polyamide 66 resin having a relative viscosity of 2.5 to 2.9 was used. (A3) a polyamide 66 resin having a relative viscosity of 4.8 to 5.3 was used.

(B) Polyamide 12 resin: (B1) a polyamide 12 resin having a relative viscosity of 1.4 to 3.3 was used. (B2) a polyamide 12 resin having a relative viscosity lower than 1.0 was used.

(C) Polyamide 6 resin: (C1) a polyamide 6 resin having a relative viscosity of 2.4 to 2.7 was used. (C2) a polyamide 6 resin having a relative viscosity of 2.9 to 3.3 was used.

(D) Modified nano-clay: (D1) a modified nano-clay obtained by treating bentonite with bis(hydrogenated tallow alkyl)dimethyl salt was used. (D2) a modified nan-clay obtained by treating bentonite with an alkyl quaternary ammonium salt was used. (D3) a modified nano-clay obtained by treating bentonite with a trialkyl ammonium salt was used.

Examples 1 to 10 and Comparative Examples 1 to 6

Figure 4:
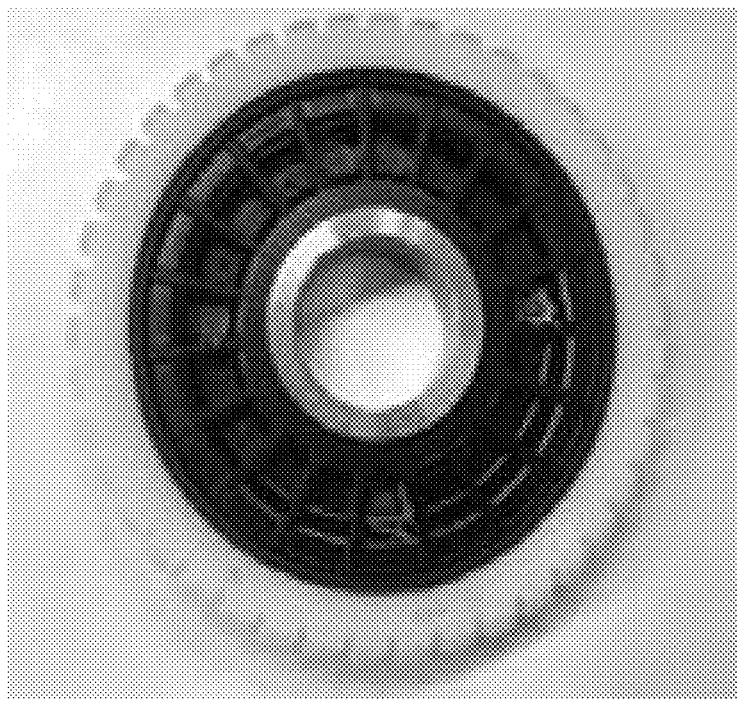
FIG. 4 is a photograph of a worm wheel manufactured using a composition for a worm wheel according to an Example of the present disclosure.

Using the components and contents shown in Tables 1 and 2 below, the components were fed into a twin-screw extruder (screw rotation speed: 250 rpm; 40Φ; feed rate: 50 kg/h), melt-kneaded, and extruded at an extrusion temperature of 260° C. to 280° C., thereby preparing a pellet-shaped worm wheel composition (worm wheel gear teeth). Then, the worm wheel composition was fed into a 220-ton injection molding machine, and injection-molded under the following conditions, thereby manufacturing a worm wheel shown in FIG. 4. The conditions are as follows: the temperature around the cylinder gate: 280° C. to 290° C.; the cylinder middle temperature: 270° C. to 280° C.; the cylinder inlet temperature: 260° C. to 270° C.; the cycle time: 190 seconds; and the cooling time: 130 seconds.

TABLE 1

| Components (wt %) | Examples | | | | | | | | | |
|---|---|---|---|---|---|---|---|---|---|---|
| | 1 | 2 | 3 | 4 | 5 | 6 | 7 | 8 | 9 | 10 |
| (A1) | — | — | — | — | — | — | — | — | — | — |
| (A2) | 70 | 85 | — | 69 | 55 | 84 | 54 | 54 | 54 | — |
| (A3) | — | — | 54 | — | — | — | — | — | — | 70 |
| (B1) | 30 | — | 30 | 30 | 30 | — | 30 | 30 | 30 | 30 |
| (C1) | — | — | — | — | — | — | — | — | — | — |
| (C2) | — | 15 | 15 | — | 15 | 15 | 15 | 15 | 15 | — |
| (D1) | — | — | — | — | — | — | — | — | 1 | — |
| (D2) | — | — | — | — | — | — | — | 1 | — | — |
| (D3) | — | — | 1 | 1 | — | 1 | 1 | — | — | — |
| Wear resistance test 1 (mg) | 140 | 198 | 190 | 101 | 75 | 174 | 58 | 60 | 58 | 231 |
| Wear resistance test 2 (mg) | 98 | 140 | 125 | 73 | 56 | 123 | 39 | 42 | 45 | 152 |

TABLE 2

| Components (wt %) | Comparative Examples | | | | | |
|---|---|---|---|---|---|---|
| | 1 | 2 | 3 | 4 | 5 | 6 |
| (A1) | 100 | — | — | — | — | — |
| (A2) | — | 100 | — | — | — | 50 |
| (A3) | — | — | 100 | — | — | — |
| (B1) | — | — | — | — | 100 | — |
| (B2) | — | — | — | — | — | 50 |
| (C1) | — | — | — | — | — | — |
| (C2) | — | — | — | 100 | — | — |
| (D1) | — | — | — | — | — | — |
| (D2) | — | — | — | — | — | — |
| (D3) | — | — | — | — | — | — |
| Wear resistance test 1 (mg) | 384 | 278 | 202 | 221 | 252 | 240 |
| Wear resistance test 2 (mg) | 232 | 196 | 165 | 153 | 135 | 179 |

Evaluation of Physical Properties

For Examples 1 to 10 and Comparative Examples 1 to 6 above, the physical properties were evaluated under the conditions described below, and the results of the evaluation are shown in Tables 1 and 2 above.

(1) Wear resistance test 1 (mg): A wear resistance test was conducted in accordance with the standard ISO 9352. Specifically, the wear resistance test was conducted using a wear resistance tester (Toyoseiki rotary abrasion tester), and the worm wheel compositions of the Examples and the Comparative Examples were used to prepare their respective 3-mm disk-shaped specimens. Each of the specimens was placed between two abrasive wheels (H-10 products) and rotated for 3,000 cycles at 70 rpm while applying a load thereto using a 1 kg weight, and then the change in weight of each specimen between before and after the test was examined.

(2) Wear resistance test 2 (mg): Evaluation was conducted in the same manner as the wear resistance test 1, except that two H-18 products were used as the abrasive wheels.

(3) Evaluation of durability: For Example 7 and Comparative Example 3 representative of the Examples and the Comparative Examples, a durability test was conducted under the conditions shown in Table 3 below, and the results of the test are shown in Table 5.

TABLE 3

| | 1 cycle | | | |
|---|---|---|---|---|
| | Torque | Rotation angle | Speed | Durability evaluation |
| Conditions | 85 Nm | ±450° | 180°/sec | Durability: evaluated up to 1,000,000 cycles; Backlash: measured every 100,000 cycles |

Figure 5:
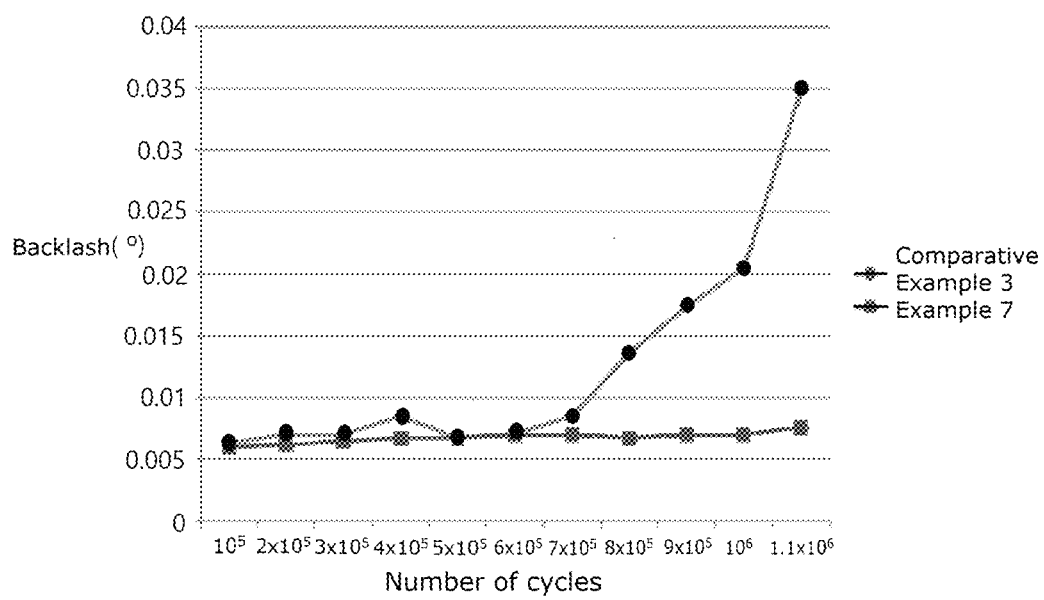
FIG. 5 is a graph showing the results of evaluating the durability of the worm wheel of Example 7 according to the present disclosure and the worm wheel of Comparative Example 3 for the present disclosure.

Referring to the results in FIG. 5, it could be seen that the worm wheel of Example 7 according to the present disclosure showed a smaller change in the backlash than the worm wheel of Comparative Example 3, suggesting that the worm wheel of Example 7 according to the present disclosure has better durability performance than the worm wheel of Comparative Example 3.

Figure 6:
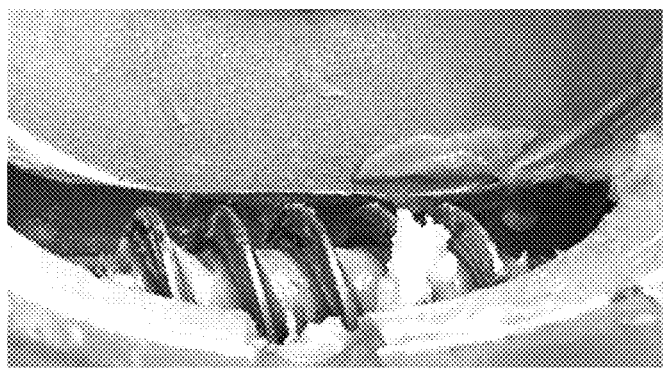
FIG. 6 shows (a) a photograph showing a lubricant after testing the durability of the worm wheel of Example 7 according to the present disclosure, and (b) a photograph showing a lubricant after testing the durability of the worm wheel of Comparative Example 3 for the present disclosure.
Figure 6:
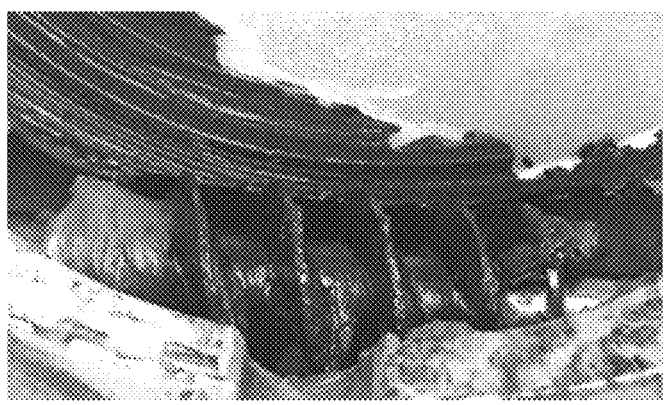

(4) Evaluation of chemical resistance: Chemical resistance was evaluated by examining whether or not a lubricant applied to the worm wheel would be discolored. During the evaluation of durability of (3) above, a lubricant (grease)

was applied to the worm wheels of Example 7 and Comparative Example 3, and the durability of the worm wheels was evaluated. Next, whether or not the lubricant applied to the worm wheels of Example 7 and Comparative Example 3 would be discolored was observed, and the results of the observation are shown in FIG. 6. FIG. 6(a) is a photograph showing the results of evaluating the chemical resistance of the worm wheel of Example 7, and FIG. 6(b) is a photograph showing the results of evaluating the chemical resistance of the worm wheel of Comparative Example 3. Referring to the results in FIG. 6, it can be seen that the lubricant in Example 7 according to the present disclosure was not discolored, but the lubricant in Comparative Example 3 which is out of the scope of the present disclosure was discolored black. This suggests that when the composition of the present disclosure is applied, it prevents polymer chain decomposition caused by lubricant penetration, and exhibits an excellent effect of suppressing adhesive wear of the worm wheel and corrosive debris from being generated by a finely decomposed lubricant component, thereby exhibiting an excellent effect of preventing discoloration (excellent chemical resistance).

Simple modifications or variations of the present disclosure may be easily carried out by those skilled in the art, and all such modifications or variations can be considered included in the scope of the present disclosure.

What is claimed is:

1. A composition for a worm wheel comprising a polyamide resin, wherein the polyamide resin comprises a polyamide 66 resin having a relative viscosity (RV) set at higher than 4.0 and lower than or equal to 5.5 and a polyamide 12 resin having a relative viscosity (RV) set at about 1.0 or higher.

2. The composition of claim 1, wherein the composition further comprises a modified nano-clay.

3. The composition of claim 2, wherein the composition comprises about 90 wt % to about 99.9 wt % of the polyamide resin and about 0.1 wt % to about 10 wt % of the modified nano-clay.

4. The composition of claim 3, wherein the polyamide resin further comprises a polyamide 6 resin having a relative viscosity of (RV) set at about 2.5 or higher.

5. The composition of claim 4, wherein the polyamide resin comprises, based on the total weight of the composition, about 50 wt % to about 85 wt % of the polyamide 66 resin, about 5 wt % to about 20 wt % of the polyamide 6 resin, and about 5 wt % to about 40 wt % of the polyamide 12 resin.

6. The composition of claim 5, wherein the polyamide 66 resin has a relative viscosity (RV) set at higher than 4.0 and lower than or equal to 5.5, the polyamide 6 resin has a relative viscosity (RV) set at about 2.5 to about 3.5, and the polyamide 12 resin has a relative viscosity (RV) set at about 1.4 to about 2.8.

7. The composition of claim 2, wherein the modified nano-clay is a nano-clay treated with a modifier comprising one or more of a trialkyl ammonium salt and an alkyl quaternary ammonium salt, wherein the nano-clay comprises one or more of bentonite, hectorite, fluorohectorite, montmorillonite, saponite, beidellite, vermiculite and magadiite.

8. The composition of claim 7, wherein the modified nano-clay has a bulk density of about 0.11 g/cm$^3$ to about 0.25 g/cm$^3$ and a d-spacing of about 10 Å to about 35 Å.

9. The composition of claim 7, wherein the modifier is comprised at a concentration of about 85 meq/(100 g nano-clay) to about 125 meq/(100 g nano-clay).

10. The composition of claim 7, wherein the modifier comprises a bis(hydrogenated tallow alkyl) dimethyl salt.

11. The composition of claim 3, wherein the composition has a structure in which the modified nano-clay is attached at the hydrogen bonding position of the polyamide resin.

12. The composition of claim 1, wherein the composition has a weight difference of about 200 mg or less between before and after a Taber abrasion test (abrasive wheels: H-10; load applied to one wheel: 1 kg; 70 rpm; and 3,000 cycles) conducted in accordance with ISO 9352.

13. A worm wheel manufactured using the composition for a worm wheel according to claim 1.

* * * * *